United States Patent
Bardera Bosch et al.

(10) Patent No.: US 8,904,182 B2
(45) Date of Patent: Dec. 2, 2014

(54) METHOD AND SYSTEM TO PROVIDE FINE GRANULAR INTEGRITY TO DIGITAL DATA

(75) Inventors: Joan Miquel Bardera Bosch, Barcelona (ES); Cevahir Demirkiran, Istambul (TR); Christophe Primault, Barcelona (ES)

(73) Assignee: Kinamik Data Integrity, S.L., Barcelona (ES)

( * ) Notice: Subject to any disclaimer, the term of this patent is extended or adjusted under 35 U.S.C. 154(b) by 183 days.

(21) Appl. No.: 12/885,726

(22) Filed: Sep. 20, 2010

(65) Prior Publication Data

US 2011/0173451 A1    Jul. 14, 2011

Related U.S. Application Data

(63) Continuation-in-part of application No. PCT/IB2009/000552, filed on Mar. 19, 2009, which is a continuation-in-part of application No. 12/052,032, filed on Mar. 20, 2008, now abandoned.

(51) Int. Cl.
*H04L 9/32* (2006.01)
*H04L 29/06* (2006.01)
*G06F 21/64* (2013.01)

(52) U.S. Cl.
CPC .................................. *G06F 21/645* (2013.01)
USPC ........................................... 713/172; 713/168

(58) Field of Classification Search
CPC ....... G06F 3/0664; G06F 3/067; G06F 3/061; G06F 3/0635
USPC ................ 713/172, 176, 157, 168, 178, 181; 711/6, 170
See application file for complete search history.

(56) References Cited

U.S. PATENT DOCUMENTS

| | | | |
|---|---|---|---|
| 5,581,790 A | 12/1996 | Sefidvash | |
| 5,694,400 A | 12/1997 | Gervais et al. | |
| 6,058,428 A * | 5/2000 | Wang et al. | 709/232 |
| 6,175,921 B1 * | 1/2001 | Rosen | 713/173 |
| 6,446,087 B1 | 9/2002 | Lai | |
| 6,516,337 B1 * | 2/2003 | Tripp et al. | 709/202 |
| 6,560,706 B1 * | 5/2003 | Carbajal et al. | 713/155 |
| 6,640,294 B2 | 10/2003 | Debiez et al. | |
| 6,779,044 B1 * | 8/2004 | Katoh | 710/5 |
| 6,784,814 B1 * | 8/2004 | Nair et al. | 341/118 |
| 7,178,029 B2 * | 2/2007 | Ansper et al. | 713/176 |

(Continued)

FOREIGN PATENT DOCUMENTS

| | | | |
|---|---|---|---|
| EP | 1243999 | * | 4/2001 |
| EP | 1 198 891 B1 | | 12/2006 |

(Continued)

OTHER PUBLICATIONS

International Search Report for PCT International Application No. PCT/IB2009/000552 mailed Jun. 16, 2009.

*Primary Examiner* — Abu Sholeman
(74) *Attorney, Agent, or Firm* — RatnerPrestia

(57) ABSTRACT

A method and system to generate fine granular integrity to huge volumes of data in real time at a very low computational cost. The invention proposes a scalable system that can receive different digital data from multiple sources and generates integrity streams associated to the original data. This invention provides full guarantees for data integrity: order of data logged cannot be altered and content cannot be modified neither added nor deleted without detection.

9 Claims, 1 Drawing Sheet

(56) References Cited

U.S. PATENT DOCUMENTS

| | | | |
|---|---|---|---|
| 7,240,194 B2* | 7/2007 | Hallin et al. | 713/156 |
| 7,249,258 B2* | 7/2007 | Honda et al. | 713/176 |
| 7,272,639 B1* | 9/2007 | Levergood et al. | 709/218 |
| 7,290,133 B1* | 10/2007 | Montgomery | 713/156 |
| 7,305,558 B1* | 12/2007 | Miyazaki et al. | 713/178 |
| 7,330,998 B2 | 2/2008 | Edirisooriya | |
| 7,441,115 B2* | 10/2008 | Miyazaki et al. | 713/156 |
| 7,464,270 B2* | 12/2008 | Patankar et al. | 713/176 |
| 7,478,239 B1* | 1/2009 | Rosen | 713/172 |
| 7,917,745 B2* | 3/2011 | Janes | 713/151 |
| 7,984,286 B2* | 7/2011 | Zimmer et al. | 713/2 |
| 8,165,294 B2* | 4/2012 | Morrow et al. | 380/251 |
| 8,422,682 B2* | 4/2013 | Ortiz Cornet et al. | 380/277 |
| 8,621,222 B1* | 12/2013 | Das | 713/176 |
| 8,694,761 B2* | 4/2014 | Zimmer et al. | 713/1 |
| 8,719,566 B2* | 5/2014 | Leichsenring et al. | 713/157 |
| 2001/0032314 A1* | 10/2001 | Ansper et al. | 713/176 |
| 2002/0032908 A1* | 3/2002 | Booth | 725/86 |
| 2002/0112162 A1* | 8/2002 | Cocotis et al. | 713/176 |
| 2004/0073799 A1* | 4/2004 | Hitz et al. | 713/176 |
| 2004/0123107 A1* | 6/2004 | Miyazaki et al. | 713/176 |
| 2005/0210236 A1* | 9/2005 | Lee et al. | 713/153 |
| 2006/0031249 A1* | 2/2006 | Peden et al. | 707/103 R |
| 2006/0064595 A1* | 3/2006 | Feinleib et al. | 713/176 |
| 2006/0265436 A1* | 11/2006 | Edmond et al. | 707/204 |
| 2007/0028211 A1* | 2/2007 | Pandit et al. | 717/115 |
| 2007/0220500 A1* | 9/2007 | Saunier | 717/162 |
| 2007/0294525 A1* | 12/2007 | Janes | 713/151 |
| 2008/0098232 A1* | 4/2008 | Miyazaki et al. | 713/176 |
| 2008/0141365 A1* | 6/2008 | Soegtrop | 726/21 |
| 2009/0012957 A1* | 1/2009 | Villaret et al. | 707/6 |
| 2009/0016534 A1* | 1/2009 | Ortiz Cornet et al. | 380/277 |
| 2009/0125712 A1* | 5/2009 | Janes | 713/151 |
| 2009/0164793 A1* | 6/2009 | Yoshioka et al. | 713/180 |
| 2009/0222674 A1* | 9/2009 | Leichsenring et al. | 713/193 |
| 2009/0238365 A1* | 9/2009 | Bardera Bosch et al. | 380/259 |
| 2009/0327684 A1* | 12/2009 | Zimmer et al. | 713/2 |
| 2009/0327741 A1* | 12/2009 | Zimmer et al. | 713/183 |
| 2010/0049992 A1* | 2/2010 | Leichsenring et al. | 713/193 |
| 2010/0153617 A1* | 6/2010 | Miroshnichenko et al. | 711/6 |
| 2010/0169633 A1* | 7/2010 | Zimmer et al. | 713/2 |
| 2011/0078458 A1* | 3/2011 | Furukawa et al. | 713/189 |
| 2011/0173451 A1* | 7/2011 | Bardera Bosch et al. | 713/172 |
| 2011/0264744 A1* | 10/2011 | Twiss et al. | 709/204 |
| 2012/0089841 A1* | 4/2012 | Boyer et al. | 713/175 |
| 2012/0265985 A1* | 10/2012 | Leichsenring et al. | 713/157 |
| 2012/0324229 A1* | 12/2012 | Buldas et al. | 713/176 |
| 2013/0054971 A1* | 2/2013 | Yamaguchi et al. | 713/171 |
| 2013/0179687 A1* | 7/2013 | Falk et al. | 713/168 |
| 2013/0185293 A1* | 7/2013 | Boback et al. | 707/728 |
| 2013/0212383 A1* | 8/2013 | Hallin et al. | 713/158 |
| 2013/0290725 A1* | 10/2013 | Hogan | 713/176 |
| 2014/0032927 A1* | 1/2014 | Das | 713/189 |
| 2014/0059236 A1* | 2/2014 | Lo et al. | 709/227 |
| 2014/0095866 A1* | 4/2014 | Grebennikov et al. | 713/156 |
| 2014/0109201 A1* | 4/2014 | Israel | 726/5 |
| 2014/0149730 A1* | 5/2014 | Joshi et al. | 713/2 |

FOREIGN PATENT DOCUMENTS

| | | |
|---|---|---|
| WO | WO 94/15290 | 7/1994 |
| WO | WO 01/01581 A1 | 1/2001 |
| WO | WO 2005/032033 A1 | 4/2005 |
| WO | WO 2008/010006 A1 | 1/2008 |

* cited by examiner

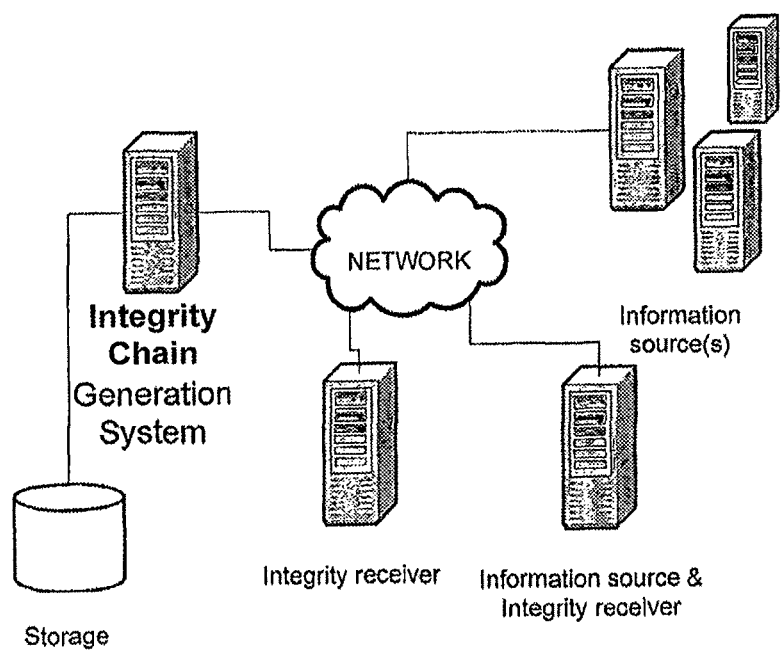

METHOD AND SYSTEM TO PROVIDE FINE GRANULAR INTEGRITY TO DIGITAL DATA

This application is a Continuation-in-Part Application of PCT International Application No. PCT/IB2009/000552, filed Mar. 19, 2009, which claims benefit of priority from U.S. application Ser. No. 12/052,032, filed Mar. 20, 2008. The contents of this application are incorporated herein by reference.

FIELD OF THE INVENTION

The present invention relates to digital data integrity and more particularly to a technique to detect malicious tampering at a very fine granular level without the performance constraints of solely using digital signatures.

BACKGROUND OF THE INVENTION

Today, almost all critical business records are generated, managed and stored electronically, creating efficiencies and cost-savings for businesses. Unfortunately, digital information can be easily deleted, altered and/or manipulated. For businesses, the burden of proof is on the company to ensure and attest to the accuracy and credibility of their electronic business records. This ability to prove the integrity of critical business records becomes especially important in litigation where executives are often called upon to support their claims of ownership of any discoverable records, as well as verify their history of creation and use.

It is important to remark the difference between involuntary changes on data (like those due to errors in transmission) and voluntary changes (tampering). When the objective is to detect involuntary changes, the integrity information is commonly calculated without any kind of security added because there is not an attacker that is also going to alter the integrity to hide the data changes. Examples of patents about verification of data integrity for involuntary changes are European Patent EP1665611 "Data transmission path comprising an apparatus for verifying data integrity", U.S. Pat. No. 5,581,790 "Data feeder control system for performing data integrity check while transferring predetermined number of blocks with variable bytes through a selected one of many channels", U.S. Pat. No. 7,330,998 "Data integrity verification", U.S. Pat. No. 6,446,087 "System for maintaining the integrity of application data", European Patent EP676068 (corresponding to U.S. Pat. No. 5,694,400) "Data integrity check in buffered data transmission" and European Patent EP1198891 "Data integrity management for data storage systems" amongst others.

But when the objective is to detect tampering, the method used to provide data integrity needs to prevent as well the tampering on the integrity information, therefore some kind of cryptography is required. The invention proposed fits in this category.

In well regulated environments that operate with large volumes of sensitive information it is needed to guarantee the integrity of data with a system that eliminates the risk of data manipulation.

Electronic records have been proven to have been manipulated in cases ranging from stock options fraud to loan fraud to intellectual property disputes.

Some recent examples of actual cases surrounding the manipulation of electronic records include:

Top executives at a successful technology company attempted to alter electronic records to hide a secret options-related slush fund to cover the tracks of their backdating options scheme.

A prominent real estate developer received an electronic version of a loan agreement to print and sign. Rather than just signing the document, he made subtle changes to it in order to make the terms of the loan more favorable to himself. The changes went undetected for a year until the loan was refinanced.

An auditor impeded a federal investigation by intentionally altering, destroying and falsifying the financial records of a now defunct credit card issuer in order to downplay or eliminate evidence that there were "red flags" that he should have caught.

Two major Wall Street firms settled with the SEC after being accused of "late trading". Late trading or "after-hours" trading involves placing orders for mutual fund shares after the market close, but still getting that day's earlier price, rather than the next day's closing price.

A prominent scientist, funded by millions of dollars in state and private funding was charged with fraud and embezzlement, after admitting that he manipulated photo images of stem cells in his research.

The industry has been addressing these deficiencies by several means, including the use of WORMs (Write Once Read Many) devices, the use of digital signatures, redundant off-site storage managed by different people, etc., but all of them have aspects to demand a more efficient solution: WORMs are slower than any other storage device and one risk is that a drive can be replaced by another one tampered; digital signatures have a high computational cost that makes impossible to use standalone in systems with significant transaction volume and do not prevent the change of order; and duplicating the storage systems and administration have cost issues and difficult the further audit process.

Most solutions are based today in the use of digital signatures (Public Key Infrastructure based) accompanied by an accurate date and time stamp to provide authenticity to the data susceptible of further audit but the following issues are not addressed:

When processing a huge volume of data, the performance required is not cost efficient or even it is directly not possible to implement because lack of performance of digital signatures.

Digital signatures and timestamps do not provide by themselves the guarantee that there have not been entries deleted without notice, which in fact means immutability is not a feature of such log registries.

There is a patent that proposes a primitive solution by using a cumulative hash function (U.S. Pat. No. 6,640,294) but it does not address the problem of malicious tampering because it is possible to recalculate the entire set of hashes to match the modified data values (it is clear when saying "[ . . . ] if there is an accidental error, attempts to recover the lost data can be made [ . . . ]" at column 3 line 32). U.S. Pat. No. 6,640,294 is also oriented to data storage.

For applications where integrity granularity is valuable, there are several recent alternatives to digital signatures based on immutable digital chains, i.e. the combination of hash chains and asymmetric cryptography (including digital signature). See for instance WO 2008/010006 A1 for a method for immutable digital chains. In that same publication there are references to prior art also using other forms of immutable digital chains.

SUMMARY OF THE INVENTION

With the proposed invention is possible to generate fine granular integrity to huge volumes of data in real time at a very low computational cost.

None of the methods that work with digital chains as defined in the previous section address the problem of detecting the complete deletion of the whole digital chain. When there is only one concurrent digital chain, deletion can be noticed by the absence of data in any given period. In high-load scenarios, it will be typical that there are several concurrent digital chains per server, and several concurrent servers, the number varying with time, so detection by absence will not be feasible.

The present invention addresses the problem of tracking many concurrent digital chains, possibly hosted in different servers, so the complete deletion of a digital chain can be detected afterwards. It proposes a data structure that keeps track of all the digital chains generated at any given time.

The invention thus enables scalable systems that can receive different digital data from multiple sources and generate integrity streams associated to the original data.

BRIEF DESCRIPTION OF THE DRAWING

The invention is best understood from the following detailed description when read in connection with the accompanying drawing. Included in the drawing is the following FIGURE:

The FIGURE is an illustration of an example embodiment of a system in which the invention may be implemented. There are several information source(s) that communicate with the Integrity Chain Generation System through a Network. There are also different integrity receivers of the immutable digital chains of integrity: Integrity Receiver, Information source & Integrity receiver and Storage media.

DETAILED DESCRIPTION

Multiple Concurrent Chains

As said before, the preferred embodiment consider generating multiple concurrently maintained digital chains to reduce latency and take a better advantage of computational load: in this embodiment every chain is independent of the other ones and works in an independent way.

In this scenario the problem of detecting the deletion of whole chains arises: when there are no concurrent chains, deletion of whole chains is implicitly evident because of huge data gaps.

Our basic solution for this issue is based on maintaining chained "Chain Lists", which are chronologically ordered records of active chains. Each entry contains a timestamp, its position in the master list, the list of the chains that were active (open) in that timestamp, a flag marking whether this is the last entry in the sequence of chain lists, the digital signature of all this and the digital signature of the previous entry.

Every time a chain is created or closed a new entry is added to the list with the updated list of active chains, the flag of the previous entry is changed and the previous entry is re-signed.

HSM

The use of an industry standard Hardware Security Module (HSM) where at least the pair of private & public keys for digital signatures are generated and the private key is hold securely, guarantees the immutability of the digital chain because nobody can access the private key used to sign, even those privileged users such as the system administrators.

For extra security, the complete algorithm can run inside an HSM.

Error Correction Codes

As an option, error correction algorithms can be applied to entries or block of entries to provide some form of protection from small tampers. This increases also the level of security as it forces attackers to delete bigger chunks of data—therefore rendering the tamper easier to detect.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A method to generate fine granular integrity to huge volumes of data in real time at a very low computational cost for use with a computer the method comprising:
   receiving original data from multiple sources, via a local computer or via a network using predetermined protocols;
   processing the original data cryptographically for generating a plurality of immutable digital chains that contain at least integrity information related to the original data including timestamps; and
   communicating said plurality of immutable digital chains to a destination, said destination being one of: a sender of the original data, a different destination or a storage media,
   wherein:
      said plurality of immutable digital chains is maintained chained and chronologically ordered in a list of active chains;
      every time a chain is generated or closed, a new entry is added to said list of active chains; and
      said ordered list of active chains is updated as follows:
   a. Updating a latest flag of a latest chain of the list of active chains to false and re-computing a digital signature of said latest flag of the latest chain of the list of active chains;
   b. Adding a new chain to the list of active chains, with said latest flag of the added chain set to true, an index set to one plus the index of a previous list of active chains, a timestamp, the list of active chains at a current moment, and a digital signature of a concatenation of the digital signature of the previous list of active chains and the contents of the new active chain list; and
   applying error correction codes to the entries or blocks of the entries.

2. The method according to claim 1, wherein an industry standard smart card or a USB crypto-token or a standard Hardware Security Module is used to generate a private key for signing the active chain lists, to keep the private key always secret, and to carry out cryptographic operations.

3. The method according to claim 1, wherein multiple concurrently maintained digital chains are generated and wherein every chain is independent of the others and works in an independent way.

4. The method according to claim 3, wherein said multiple concurrently maintained digital chains are maintained in a single server or in a plurality of servers.

5. A system to generate fine granular integrity to huge volumes of data in real time at a very low computational cost comprising:
   at least one independent hardware server having a processor for, executing a program, platform independent implementation that can run on standard hardware, to generate fine granular integrity to huge volumes of data in real time at a very low computational cost for use with a computer, wherein, the processor receives original data from multiple sources, via a local computer or via a network using predetermined protocols;

the processor processes the original data cryptographically for generating a plurality of immutable digital chains that contain at least integrity information related to the original data including timestamps; and the processor communicates said plurality of immutable digital chains to a destination, said destination being one of: a sender of the original data, a different destination or a storage media, wherein:

said plurality of immutable digital chains are maintained chained and chronologically ordered in a list of active chains;

every time a chain is generated or closed a new entry is added to said list of active chains, and said ordered list of active chains is updated as follows:

a. Updating a latest flag of a latest chain of the list of active chains to false, and re-computing a digital signature of said latest flag of the latest chain of the list of active chains; and b. Adding a new chain to the list of active chains, with said latest flag of the added chain set to true, an index set to one plus the index of a previous list of active chains, a timestamp, the list of active chains at a current moment, and a digital signature of a concatenation of the digital signature of the previous list of active chains and the contents of the new active chain list, and wherein error correction codes are applied to entries or block of entries.

6. A system to generate fine granular integrity to huge volumes of data in real time at a very low computational cost comprising:

at least one independent hardware server having a processor and hosting a software program, platform independent implementation that can run on standard hardware, to generate fine granular integrity to huge volumes of data in real time at a very low computational cost for use with a computer, wherein the processor receives original data from multiple sources, via a local computer or via a network using predetermined protocols;

the processor processes the original data cryptographically for generating a plurality of immutable digital chains that contain at least integrity information related to the original data including timestamps; and the processor communicates said plurality of immutable digital chains to a destination, said destination being one of: a sender of the original data, a different destination or a storage media, wherein:

said plurality of immutable digital chains are maintained chained and chronologically ordered list of active chains is provided;

every time immutable digital chains are generated or closed said ordered list of active chains is updated as follows:

a. Updating a latest flag of a latest chain of the list of active chains to false, and re-computing a digital signature of said latest flag of the latest chain list; and b. Adding a new chain to the list of active chains, with said latest flag of the added chain set to true, an index set to one plus the index of a previous list of active chains, a timestamp, the list of active chains at a current moment, and a digital signature of a concatenation of the digital signature of the previous list of active chains and the said contents of the new active chain list, wherein error correction codes are applied to entries or block of entries, and wherein an industry standard smart card or a USB crypto-token or a standard Hardware Security Module is used to generate a private key for signing the active chain lists, to keep the private key always secret, and to carry out cryptographic operations.

7. The system according to claim 5, wherein a device selected among an industry standard Hardware Security Module (HSM), a smart card or a USB crypto-token is used to generate at least one private key, keep the at least one private key always secret, and use the at least one private key to carry out cryptographic operations.

8. A computer readable non-transitory medium adapted to instruct a general purpose computer to generate fine granular integrity to huge volumes of data in real time at a very low computational cost, using a method to generate fine granular integrity to huge volumes of data in real time at a very low computational cost for use with a computer the method comprising:

receiving original data from multiple sources, via a local computer or via a network using predetermined protocols;

processing the original data cryptographically for generating a plurality of immutable digital chains that contain at least integrity information related to the original data including timestamps; and communicating said plurality of immutable digital chains to a destination, said destination being one of: a sender of the original data, a different destination or a storage media, wherein:

said plurality of immutable digital chains are maintained chained and chronologically ordered in a list of active chains;

every time a chain is generated or closed a new entry is added to said list of active chains, and said ordered list of active chains is updated as follows:

a. Updating a latest flag of a latest chain of the list of active chains to false, and re-computing a digital signature of said latest flag of the latest chain of the list of active chains; and b. Adding a new chain to the list of active chains, with said a latest flag of the added chain set to true, an index set to one plus the index of a previous list of active chains, a timestamp, the list of active chains at a current moment, and a digital signature of a concatenation of the digital signature of the previous chain list of active chains and the contents of the new active chain list, and wherein said method is performed with error correction codes applied to entries or block of entries.

9. A computer readable non-transitory medium adapted to instruct a general purpose computer to generate fine granular integrity to huge volumes of data in real time at a very low computational cost, using a method to generate fine granular integrity to huge volumes of data in real time at a very low computational cost for use with a computer the method comprising:

receiving original data from multiple sources, via a local computer or via a network using predetermined protocols;

processing the original data cryptographically for generating a plurality of immutable digital chains that contain at least integrity information related to the original data including timestamps; and communicating said plurality of immutable digital chains to a destination, said destination being one of: a sender of the original data, a different destination or a storage media, wherein:

said plurality of immutable digital chains are maintained chained and chronologically ordered in a list of active chain, every time a chain is generated or closed a new entry is added to said list of active chains, and said ordered list of active chains is updated as follows:
a. Updating a latest flag of a latest chain of the list of active chains to false, and re-computing a digital signature of said latest flag of the latest chain of the list of active chains; and
b. Adding a new chain to the list of active chains, with said latest flag of the added chain set to true, an index set to one plus the index of a previous list of active chains, a timestamp, the list of active chains at a current moment, and a digital signature of a concatenation of the digital signature of the previous list of active chains and the contents of the new active chain list, wherein said method is performed with error correction codes applied to entries or block of entries, and wherein an industry standard smart card or a USB cryptotoken or a standard Hardware Security Module is used to generate a private key for signing the active chain lists, to keep the private key always secret, and to carry out cryptographic operations.

* * * * *